United States Patent [19]

Lama et al.

[11] 4,011,009

[45] Mar. 8, 1977

[54] REFLECTION DIFFRACTION GRATING HAVING A CONTROLLABLE BLAZE ANGLE

[75] Inventors: William L. Lama, Webster; Ned J. Seachman, Penfield, both of N.Y.; Clark I. Bright, Arcadia, Calif.

[73] Assignee: Xerox Corporation, Stamford, Conn.

[22] Filed: May 27, 1975

[21] Appl. No.: 580,654

[52] U.S. Cl. .......................... 350/162 R; 350/161 S
[51] Int. Cl.² ...................... G02B 5/18; G02F 1/19
[58] Field of Search .............. 350/161 DM, 162 R; 332/7.51

[56] References Cited

UNITED STATES PATENTS

| | | | |
|---|---|---|---|
| 3,158,430 | 11/1964 | McNaney | 350/161 |
| 3,861,784 | 1/1975 | Torok | 350/162 R |
| 3,905,683 | 9/1975 | Roach et al. | 350/161 |
| 3,907,407 | 9/1975 | Vilkomerson et al. | 350/161 |
| 3,912,386 | 10/1975 | Gorog et al. | 350/161 |

*Primary Examiner* — Ronald J. Stern

[57] ABSTRACT

Apparatus and method for modulating quasi-monochromatic electromagnetic radiation utilizing a controllable diffraction grating. A reflection diffraction grating is comprised of a material deformable in the presence of an applied electric field. A first electrode, comprised of a flexible radiation-reflecting material, is applied to the first surface of the deformable material, forming a reflecting surface of the diffraction grating. A second electrode is applied to a second surface of the deformable material. The electrodes are arranged to provide a periodic surface distortion on the reflecting electrode upon application of a voltage between the first and the second electrodes, thereby resulting in a blazed diffraction grating. In addition, the blaze angle of the diffraction grating can be varied as a function of applied voltage, and consequently diffracted radiation pattern can be modulated as a function of the applied voltage. The controllable diffraction grating can modulate the diffracted radiation in a digital or in an analog mode of operation.

11 Claims, 6 Drawing Figures

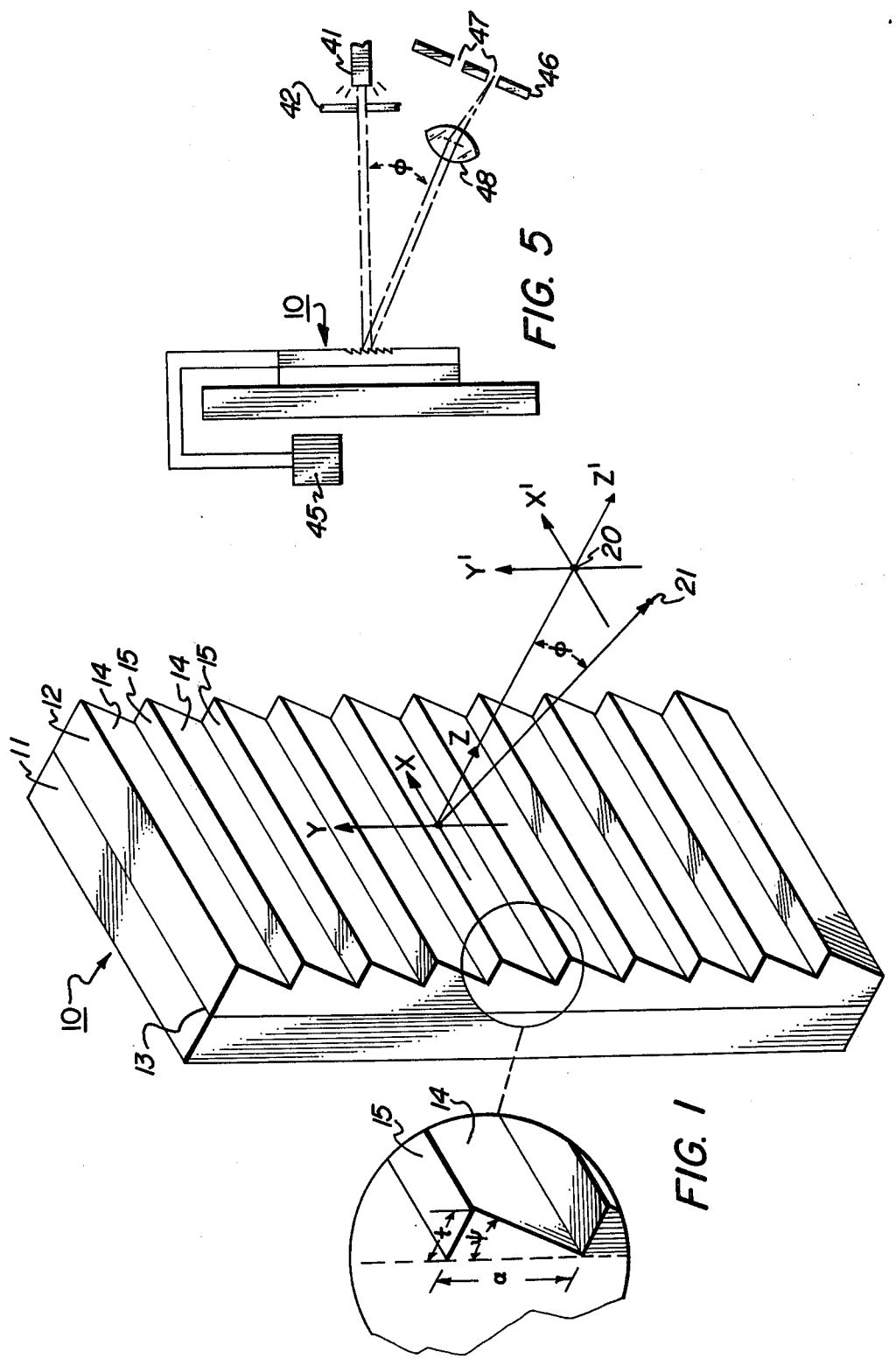

REFLECTION DIFFRACTION GRATING HAVING A CONTROLLABLE BLAZE ANGLE

This invention relates generally to the modulation of monochromatic radiation and more particularly to the modulation of monochromatic radiation by a controllable diffraction grating. The periodic reflecting surface pattern or blaze angle of a reflection diffraction grating can be controlled with an externally applied voltage by the disclosed apparatus.

It is known in the prior art to provide a modulator for monochromatic radiation which utilizes material having optical properties dependent on an externally applied voltage. For example, U.S. Pat. No. 3,843,231, issued on Oct. 22, 1974, to Borel et al, describes the use of selected liquid crystals, having component molecules orientable in an electric field, to provide a transmission diffraction grating. A modulator utilizing liquid crystals has a relatively long response time arising from the weak inter-molecular forces causing relaxation of the molecular orientation upon removal of the electric field. The modulator design disclosed by this patent is not conveniently adaptable to a reflective-type diffraction grating. In addition, it is not possible, utilizing the disclosed structure to control in a simple manner the blaze angle of the periodic grating structure. Thus, control of the diffraction pattern by the disclosed structure, except as a radiation switch, is similarly complicated.

It is also known in the prior art to utilize materials having an index of refraction dependent on an electric field to modulate monochromatic radiation. In U.S. Pat. No. 3,726,585, issued on Apr. 10, 1973 to Fedotowsky et al, a change of index of refraction, produced by changing an applied electric field to an appropriate material, determines the intensity of radiation transmitted across a boundary of two materials as well as the intensity of light reflected from the boundary. This effect is enhanced by operation near a critical angle of the boundary. A modulator of this design does not control conveniently the angle of the output radiation, but merely controls the intensity of the output radiation. Furthermore, the intensity of radiation lost in transmission through the device can be unacceptably large.

It is further known in the prior art that propagation of surface waves on a suitable substrate can be utilized to modulate optical radiation. For example, in U.S. Pat. No. 3,585,392, issued on June 15, 1971 to A. Korpel, a diffraction grating formed by propagating surface waves is described. This type of modulator can be limited by the properties of the material upon which the surface waves are propagated. The properties of the material determine the velocity of propagation and the frequency range in which propagation can occur, and therefore determines the periodic structure of the possible diffraction gratings. It is, of course, necessary to impose a desired grating modulation frequency on electrical signals in a frequency range to which the substrate material is responsive. Furthermore, the diffraction grating, comprised of distortions having a generally sine wave configuration, can provide an unacceptable grating configuration. Fabrication of surface wave devices, including the requirement of suitable electromechanical transducers, can provide an undesirably complex apparatus. High efficiency of the apparatus can require critical alignment of the incident beam with the Bragg angle.

It is therefore an object of the present invention to provide an improved modulator for electromagnetic radiation.

It is another object of the present invention to provide an improved modulator for quasi-monochromatic radiation.

It is a further object of the present invention to provide a modulator for monochromatic radiation comprising a controllable diffraction grating.

It is still another object of the present invention to provide a diffraction grating comprised of a material deformable under applied electric field.

It is yet another object of the present invention to provide a diffraction grating for which the permitted angles of the diffracted radiation can be determined by the period of the electrode structure.

It is yet another object of the present invention to provide a diffraction grating for which the angle of the diffracted radiation pattern maximum can be controlled by an externally applied voltage.

It is a more particular object of the present invention to provide a blazed diffraction grating for which the blaze angle, and thus the angular distribution of the intensity of the diffracted radiation, is a function of an externally applied voltage.

It is still a further object of the present invention to provide a modulator for monochromatic radiation which can be utilized in either a digital or analog mode of operation.

The aforementioned and other objects are accomplished, according to the present invention, by a diffraction grating comprised of a material deformable under an applied electric field. The electric field is applied to the deformable material in such a manner as to provide a periodic distortion of a reflecting surface, the surface distortion producing diffraction patterns for radiation reflected therefrom. By altering the strength of the electric field applied to the deformable material, the blaze angle of the diffraction grating can be varied, thereby varying the angular distribution of the diffracted radiation pattern. By proper selection of the electrode structure applying the electric field the electromagnetic energy of the diffracted radiation can be channeled into a single order of the diffraction pattern. The angular distribution of the diffracted radiation is also controlled by the electrode structure.

The controllable diffraction grating, when utilized in conjunction with suitably positioned apertures, permits a digital-type switching apparatus. Furthermore, utilizing the continuously variable property of the reflecting surface deformation of the diffraction grating with a suitably positioned aperture, analog-type operation can be achieved.

These and other features of the invention will be understood upon the reading of the following description together with the drawings:

FIG. 1 is a perspective diagram of a typical blazed diffraction grating;

FIG. 5 is a schematic diagram of the utilization of the controllable diffraction grating in either a digital or an analog mode of operation and FIG. 6 is a cross-sectional diagram of a fourth embodiment of the controllable diffraction grating according to the present invention.

Figure 4:
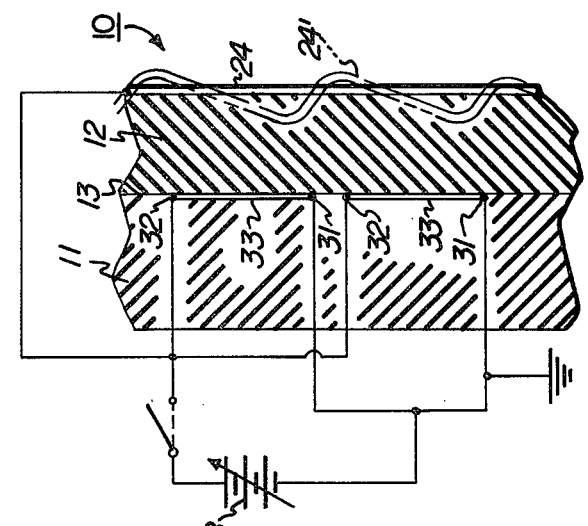
FIG. 4 is a cross-sectional diagram of a third embodiment of the controllable diffraction grating according to the present invention.

Referring now to FIG. 1, a perspective view of a typical blazed diffraction grating is shown. An x-y coordinate system is shown in the plane of the diffraction grating to facilitate discussion of FIG 1. The diffraction grating, in an idealized embodiment, is comprised of a multiplicity of inclined surfaces 14. The inclined surfaces 14 extend generally uniformly the length of the diffraction grating in the $x$ dimension. In the $y$ dimension, the inclined surfaces have a periodicity of dimension $a$, the plane surfaces generally increasing uniformly a distance $t$ in the $z$ dimension over the distance $a$ in the $y$ dimension before abruptly decreasing a distance equal to $t$. The relatively abrupt change of $t$ is indicated as surfaces 15 in FIG. 1. The magnitude of the diffraction grating in the $y$ dimension is $Na$, where N is the number of inclined surfaces. The angle $\psi$, defined by $\tan \psi = t/a$ is called the blaze angle of the diffraction grating.

In the reflection diffraction grating, substrate 11 provides physical support for the diffraction grating, while grating material 12 is comprised of an elastomer deformable under the action of an applied electric field. Electrode 13 which can have a complex structure, is located between the substrate and the elastomer. The portion of the grating including inclined surfaces 14 and connecting surfaces 15 are coated with an optically reflecting material. The surfaces 14 and 15 function both as an electrode and a reflector of incident radiation.

When a radiation source 20, positioned along the $z$ axis of the coordinate system located on the grating reflecting surface, illuminates substantially the entire diffraction grating with monochromatic radiation, the incident radiation being substantially perpendicular to the x-y plane of FIG. 1, the diffracted radiation has a normalized intensity denoted by I ($\phi$); $\phi$ is the angle between the perpendicular to the diffraction grating (i.e., the $z$) shown in FIG. 1 and an observation point 21 for the diffracted radiation. An infinite number of other source locations are possible and corresponding diffraction maxima are described by diffraction theory.

Figure 2:
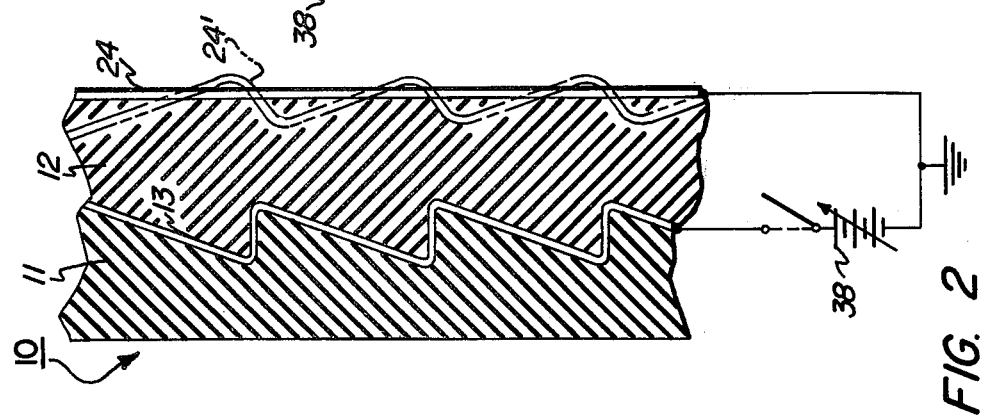
FIG. 2 is a cross-sectional diagram of a first embodiment of a controllable diffraction grating according to the present invention.

Referring next to FIG. 2, a cross-sectional view of a first embodiment of the controllable blazed diffraction grating 10 is shown. Substrate 11 provides support for the elastomer 12 which is deformable under an electric field. Electrode 13 is located between the substrate 11 and the elastomer 12. Electrode 13 is structured to comprise a multiplicity of blaze surfaces with the same periodicity desired in the structure of the diffraction grating. A second surface of the elastomer 12 has a flexible electrode 24 deposited thereon.

In the absence of applied potential between electrode 24 and electrode 13, the structure of the surface of the elastomer supporting electrode 24 is generally a plane. However, upon application of a potential between electrodes 24 and 13, the surface supporting electrode 24 begins to deform to become electrode 24'. Because regions of the electrode 13 are in closer proximity to the electrode 24, these regions will be deformed to a greater extent than regions that are further away from electrode 24. As will be clear, the substrate serves to minimize distortions in the electrode 13. As will also be clear, as the strength of the potential between electrode 13 and 24 is increased, the distortions (24') become larger resulting in a gradually increasing blaze angle for the resulting diffraction grating.

Figure 3:
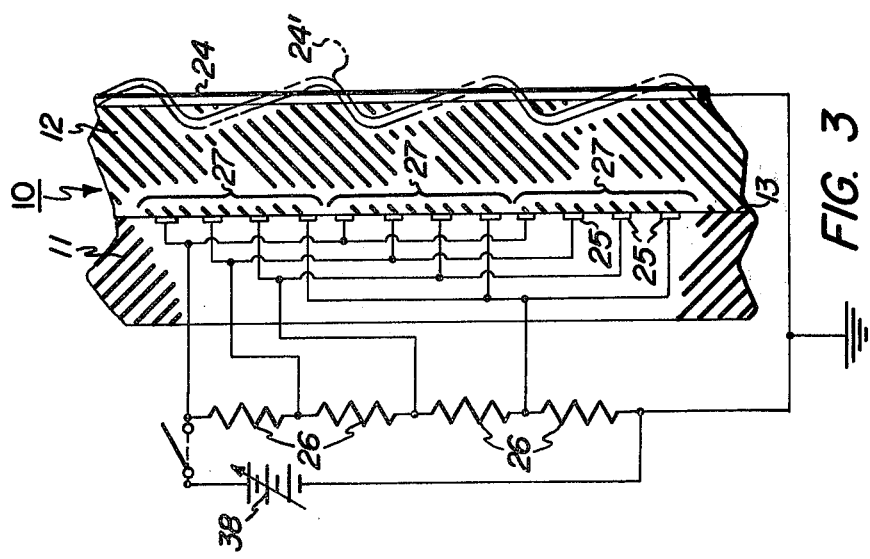
FIG. 3 is a cross-sectional diagram of a second embodiment of a controllable diffraction grating according to the present invention.

Referring now to FIG. 3, a cross-sectional view of a second embodiment of a controllable blazed diffraction grating is shown. An electrode 13 is deposited between substrate 11 and elastomer 12, while a second surface of elastomer 12 has an electrode 24 deposited thereon. However, instead of electrode 13 being a single extended electrode, electrode 13 is comprised of a multiplicity of groups 27 of conducting strips 25. Each group of conducting strips 27 is associated with an inclined plane of the diffraction grating. Each successive conducting strip 25 has applied thereto an increasing voltage compared with the other members of the group. By way of example, resistance dividing network 26 of FIG. 3 applies monotonically increasing voltage to successive members of each conductive strip 25 of the groups 27. Upon application of a variable voltage source 38 to the resistance dividing network, electrode 24 being electrically coupled to a common terminal, the distortion caused by the monotonically increasing electric fields will produce a multiplicity of generally inclined planal structures, the blaze angle of the inclined planes being a function of the voltage source 38. That is, the reflecting electrode 24 will assume, upon application of the voltage source, a configuration shown in a schematic cross-section by electrode 24'.

Referring next to FIG. 4, a cross-sectional view of a third embodiment for producing a controllable blazed diffraction according to the present invention. In this embodiment, electrode 13, positioned between substrate 11 and elastomer 12, is comprised of a multiplicity of electrodes 33. Each of electrodes 33 is associated with an inclined plane of the diffraction grating. A second reflecting electrode 24 is applied to an opposing surface of elastomer 12. Variable voltage source 38 is applied to one edge 31 of each electrode 33 and to a second edge 32 of each electrode 33, edges 32 also being electrically coupled to electrode 24. Each of electrodes 33 are structured to produce a generally uniform potential drop between edge 31 and edge 32. Upon application of potential source 38 and before deformation of electrode 24, the strongest electric field will be present between edge 31 of electrode 33 and electrode 24. The elastomer between electrode 33 and electrode 24 will experience a progressively smaller distorting electric field as the distance from edge 31 is increased. The reflecting electrode, after distortion of the elastomer has been completed, has the schematic cross-section appearance of electrode 24'.

The electrodes producing the deformation in flexible surface 24 of FIGS. 2, 3 and 4 can be arranged to replace the abrupt transition (denoted by $t$ in FIG. 1) of distroted surface 24' with a second series of inclined planes. The presence of the second set of inclined planes can result in a distribution of the diffracted radiation into two diffraction patterns.

Referring now to FIG. 5, a schematic diagram of the controllable diffraction grating utilized as a modulator of monochromatic radiation is shown. A source of monochromatic radiation is collimated and directed toward the controllable diffraction grating 10 through aperture 42. It will be clear that the diffraction grating will operate most efficiently when the impinging radiation fills the entire diffraction grating blazed surface. The light source can, for example, be a laser. The intensity of the diffracted radiation pattern in the direction $\phi$ is controlled by a variable voltage source 45 which applies an appropriate voltage to the electrodes of grating 10. The voltage applied to grating 10 by the variable voltage source 45, by determining the angle $\phi$, can selectively put most of the diffracted radiation into one, of a plurality of apertures 47 in surface 46. Thus, digital switching can be achieved by having a voltage applied by variable voltage source 45 corresponding to an associated one of apertures 47. A lens 48 can be positioned between diffraction grating 10 and surface 46 to focus the diffracted electromagnetic radiation. Similarly, a portion of the diffracted radiation pattern, passing through a pre-selected one of apertures 47, can be caused to vary as a function of voltage applied by modulator 45 and analog operation can be achieved. It will be clear that it is possible to scan the diffracted radiation beam among the permitted orders with variable voltage means 45.

Figure 6:
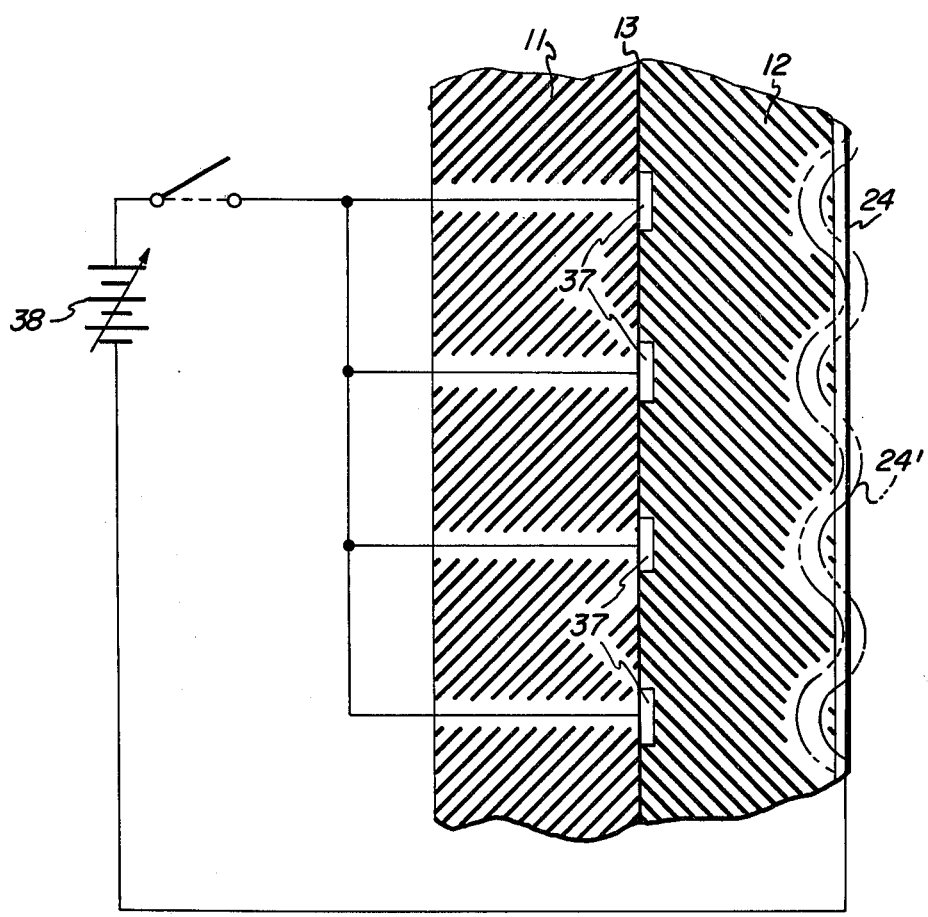

Referring now to FIG. 6, a cross-sectional view of a fourth embodiment of a controllable blazed diffraction grating is shown. An electrode structure 13 is deposited on an interface between a substrate 11 and an elastomer 12. A second surface of elastomer 12 has an electrode 24, comprised of a conducting reflecting material, applied thereto. Electrode structure 13 is comprised of a multiplicity of generally equi-spaced, parallel electrode elements 37. Upon application of a potential from variable voltage source 38 between elements 37 and electrode 24, elastomer 12 will be deformed, causing electrode 24 to form a periodic configuration, for example as shown by electrode 24'. The magnitude of the periodic deformation will be a function of the applied potential between electrode elements 37 and electrode 24. The periodicity of the deformed electrode 24' will be a function of the density of electrode elements 37.

The operation of the monochromatic diffraction grating modulator is determined, according to the present invention, by the periodic deformation of the elastomer material upon which the reflection surface is deposited. The periodic deformation is the result of an externally applied voltage. The amount of distortion of the surface of the elastomer and therefore the blaze angle of the reflection diffraction grating is a function of the strength of the applied voltage. Consequently, the distribution of the diffracted radiation pattern among the permitted diffraction orders depends on the voltage applied to the elastomer. It will be clear to those skilled in the art that a certain amount of deviation from the ideal grating blaze of structure will occur in the described embodiments. This departure from an ideal grating will have the effect of causing departures from the configuration previously described. However, these departures from an optimum configuration will not render the embodiments inoperative but rather produce a background or noise component in the diffracted radiation pattern.

By proper selection of diffraction grating parameters, the diffracted radiation can be channeled into substantially a single diffraction pattern order, a diffraction pattern order being a direction in which wave fronts of the reflected radiation are in phase. That is to say, the envelope of the equation for the diffraction pattern coincides with the single maximum of the several maxima possible while attenuating the remaining maxima. The envelope of the diffraction pattern is determined by the diffraction pattern blaze angle. In practice $a$ can be chosen to give a reasonable separation of diffraction pattern orders and $Na$ can be chosen to provide adequate resolution of the orders.

It will be clear further that the source of radiation should be quasi-monochromatic and that the deviation from the monochromaticity can cause further deviation from the formulas described above. In the preferred embodiment, the desired radiation source is generally the output of a laser source and consequently the monochromaticity in this embodiment is assured. As described above, the operation of the apparatus is not limited to the described radiation source located directly before the diffraction grating. The radition source can be located in other positions. The equations describing the diffraction pattern will be more complicated, but similar operation can result with a radiation source at other locations.

It will be further clear that the disclosed embodiment can be utilized for scanning a diffracted radiation beam through an angle. It has been found, however, that the relatively small number of permitted spot positions per scan line limits the usefulness of this modulator as a scanning device.

Although the embodiments described above refer to a reflecting diffraction grating, it will be clear that a transmission diffraction grating utilizing the elastomer distortion under electric field, can be achieved. The operation of the diffraction grating depends upon periodic phase retardation of portions of the impinging monochromatic electromagnetic radiation. However, in the transmission mode, account must be taken of any variation of the optical properties of the elastomer which are produced in the presence of elastomer distortion.

In the embodiments illustrated in FIGS. 2, 3 and 4, the electrode structure is chosen to provide the apparatus with a multiplicity of generally parallel surfaces, thereby minimizing departures from an ideal diffraction pattern. The simplified electrode structure, illustrated in FIG. 6 provides a diffraction grating with a generally greater departure from an ideal diffraction pattern. In many applications, this greater departure from the ideal diffraction pattern can be tolerated. Furthermore, the monochromatic radiation, impinging on an axis which is perpendicular to the grating surface, will be diffracted into two generally symmetrical diffraction patterns. Appropriate positioning of the monochromatic radiation source or a plurality of detectors can be utilized to compensate for the properties of the symmetrical diffraction grating as will be clear to those skilled in the art.

The above description is included to illustrate the operation of the preferred embodiment and is not meant to limit the scope of the invention. The scope of the invention is to be limited only the the following claims. From the above discussion, however, many variations will be apparent to those skilled in the art and would yet be encompassed by the spirit and scope of the invention.

What is claimed is:

1. A blazed reflection diffraction grating comprising:
   a first electrode coupled to a substrate material;
   an elastomeric material coupled to said first electrode, said elastomeric material deformable upon application of an electric field thereto; and a second electrode coupled to said elastomeric material, said second electrode coupled to a surface of said material positioned opposedly to said first electrode, said second electrode comprising an optically reflecting material, at least a part of said second electrode becoming a multiplicity of generally uniform planar regions upon application of a periodic electric field having a repeating sawtooth profile between said first and said second electrode, wherein said planar regions are substantially parallel and inclined at substantially a constant angle to said first electrode after said application of a periodic electric field.

2. The diffraction grating of claim 1, wherein said first electrode has a generally sawtooth cross-sectional configuration.

3. The diffraction grating of claim 1 wherein said first electrode has a plurality of conducting strips associated with each of said planar regions.

4. The diffraction grating of claim 1 wherein said first electrode is comprised of a multiplicity of resistive strips, each of said resistive strips being associated with one of said planar regions.

5. A diffraction grating having a controllable blaze angle comprising:
   a material deformable under an applied electric field;
   a first electrode coupled to a first surface of said deformable material;
   a second electrode comprised of an optically reflecting material coupled to a second surface of said deformable material; said first and said second electrode providing a periodic electric field having a repeating sawtooth profile in said deformable material upon application of a potential difference between said first and said second electrode, said periodic electric field providing periodic surface distortions of said second electrode, said surface distortions being related to a magnitude of said applied potential.

6. The diffraction grating of claim 5 wherein said first electrode has a generally sawtooth configuration, and said second electrode is substantially planar in an absence of said applied potential.

7. The diffraction grating of claim 5 wherein said first electrode is comprised of a multiplicity of groups of conducting material strips, each of said groups associated with a one of said periodic distortions.

8. The diffraction grating of claim 7 wherein successive conduction strips of each group receive monotonically increasing portion of said applied voltage, each surface distortion including a generally planar configuration inclined to said second surface at an angle substantially determined by a magnitude of said applied voltage.

9. A reflection diffraction grating having a variable blaze angle, including
   an elastomeric material deformable under the influence of an electric field and disposed in a plane of $X-Y$ orthogonal axes,
   a first electrode disposed on a first surface of said elastomeric material,
   a second electrode disposed on a second opposite surface of said elastomeric material, said second electrode including an optically reflective outer surface,
   said first electrode and said second electrode thus being disposed in face-to-face relationship across said elastomeric material,
   said first electrode being disposed to address said second electrode by a difference of potential relative to said second electrode which is uniform along $x$ dimensions of said elastomeric material and which varies linearly in a repeating pattern along $y$ dimensions of said elastomeric material to result in a generally saw-tooth voltage profile along said $y$ dimension and a corresponding saw-tooth configuration of said reflective outer surface of said second electrode, and
   means to vary the voltage impressed on said first and second electrodes to vary the linear relationship of the difference of potential between said first and second electrodes to correspondingly vary the blaze angle of said grating.

10. A reflection diffraction grating as defined in claim 9 in which said first electrode is disposed in sawtooth configuration defining parallel inclined surfaces relative to said second electrode.

11. A reflection diffraction grating as defined in claim 9 in which said first electrode includes a plurality of conductive strips, each of said strips being operatively connected at one edge thereof to a first voltage level and at the other edge thereof to a second voltage profile of said first electrode relative to said second electrode.

* * * * *